(12) United States Patent
Yach et al.

(10) Patent No.: US 8,510,225 B2
(45) Date of Patent: Aug. 13, 2013

(54) SPLIT CHANNEL AUTHENTICITY QUERIES IN MULTI-PARTY DIALOG

(75) Inventors: David Yach, Waterloo (CA); Herbert A. Little, Ontario (CA); Gerhard D. Klassen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 10/931,211

(22) Filed: Sep. 1, 2004

(65) Prior Publication Data
US 2006/0047606 A1 Mar. 2, 2006

(51) Int. Cl.
*G06F 21/00* (2013.01)

(52) U.S. Cl.
USPC .................................. 705/50; 705/51; 705/52

(58) Field of Classification Search
USPC .......... 713/155, 50, 201; 705/50, 51; 726/26
See application file for complete search history.

(56) References Cited

U.S. PATENT DOCUMENTS

| | | | |
|---|---|---|---|
| 5,668,876 A * | 9/1997 | Falk et al. | 380/271 |
| 5,721,779 A * | 2/1998 | Funk | 713/155 |
| 5,764,767 A * | 6/1998 | Beimel et al. | 713/180 |
| 5,774,525 A * | 6/1998 | Kanevsky et al. | 379/88.02 |
| 6,957,349 B1 * | 10/2005 | Yasukura | 726/26 |
| 7,043,230 B1 * | 5/2006 | Geddes et al. | 455/410 |
| 2001/0055388 A1 * | 12/2001 | Kaliski, Jr. | 380/30 |
| 2002/0004831 A1 * | 1/2002 | Woodhill | 709/229 |
| 2002/0129247 A1 * | 9/2002 | Jablon | 713/169 |
| 2002/0178385 A1 * | 11/2002 | Dent et al. | 713/202 |
| 2003/0018893 A1 * | 1/2003 | Hess et al. | 713/169 |
| 2003/0056096 A1 * | 3/2003 | Albert et al. | 713/168 |
| 2003/0065918 A1 * | 4/2003 | Willey | 713/168 |
| 2003/0101339 A1 * | 5/2003 | Bianchini et al. | 713/153 |
| 2003/0177383 A1 * | 9/2003 | Ofek et al. | 713/200 |
| 2003/0177401 A1 * | 9/2003 | Arnold et al. | 713/202 |
| 2004/0019786 A1 * | 1/2004 | Zorn et al. | 713/168 |
| 2004/0044627 A1 * | 3/2004 | Russell et al. | 705/50 |
| 2004/0062400 A1 * | 4/2004 | Sovio et al. | 380/286 |
| 2005/0076216 A1 * | 4/2005 | Nyberg | 713/171 |

(Continued)

FOREIGN PATENT DOCUMENTS

| | | |
|---|---|---|
| CA | 2515873 | 5/2011 |
| EP | 1422960 A1 | 5/2004 |
| EP | 1633102 | 11/2006 |

OTHER PUBLICATIONS

Microsoft Computer Dictionary—Third Edition, p. 399.*

(Continued)

*Primary Examiner* — Evens J Augustin
(74) *Attorney, Agent, or Firm* — Bereskin & Parr LLP/S.E.N.C.R.L., s.r.l.

(57) ABSTRACT

Authenticity of a proposed future or current participant in a multi-party dialog is checked by splitting an authenticity challenge query into at least two portions wherein none of the portions individually contains sufficient information to fully define the challenge query. These separated portions are then sent to another dialog participant over at least two different communication channels thus enhancing the probability that a successive challenge response is authentic. The authenticity challenge query and splitting thereof into plural portions may include formation of a logical combination (e.g., exclusive-OR) of first and second data strings (one of which may be a challenge question) to produce a resultant third data string where the separated and separately communicated portions include the first and third data strings as separate portions as being sent over respectively different communication channels.

25 Claims, 4 Drawing Sheets

(56) References Cited

U.S. PATENT DOCUMENTS

| | | | |
|---|---|---|---|
| 2005/0125663 A1* | 6/2005 | Funk | 713/168 |
| 2005/0166263 A1* | 7/2005 | Nanopoulos et al. | 726/7 |
| 2006/0005033 A1* | 1/2006 | Wood | 713/182 |

OTHER PUBLICATIONS

Schneier, "Applied Cryptography", 1996.*

Response. European Application No. 04255278.6. Dated: Nov. 30, 2005.

Communication under Rule 51(4) EPC. European Application No. 04255278.6. Dated: Apr. 7, 2006.

Decision to grant a European patent pursuant to article 97(2) EPC. European Application No. 04255278.6. Dated: Oct. 6, 2006.

Notice of Allowance. Canadian Application No. 2,515,873. Dated: Aug. 30, 2010.

Office Action. Canadian Application No. 2,515,873. Dated: Oct. 1, 2009.

* cited by examiner

US 8,510,225 B2

SPLIT CHANNEL AUTHENTICITY QUERIES IN MULTI-PARTY DIALOG

BACKGROUND OF THE INVENTION

1. Field of the Invention

This invention relates generally to the field of substantially real time multi-party dialogs between communication devices/participants (e.g., sometimes referred to as Instant Messaging (IM) and/or Quick Messaging (QM). More particularly, this invention deals with method, apparatus and computer program storage media useful for checking the authenticity of proposed future or current participants in a substantially real time multi-party dialog between communication devices/participants.

2. Related Art

Systems which permit substantially real time dialog between plural mobile communication units/participants have already become common. Some of these systems have been referred to as instant messaging (IM) which started out in LAN-line environments but which have now evolved to a wireless environment using mobile communication devices. The number of available mobile communication devices is already very large (e.g., cell phones, smart phones, PDAs, pagers, phone-enabled laptop computers and a range of other devices). To the extent that such earlier systems rely upon communication of numerous housekeeping messages (e.g., status of participants, buddy lists, buddy statuses, etc.), such arrangements can become cumbersome in a wireless environment with relatively limited bandwidths. Accordingly, some more recent developments involving peer-to-peer substantially real time dialogs between multi-parties are being implemented.

Some prior authentication schemes are exemplified by prior art such as: US 2002/0004831 A1 (Woodhill); EP 1,422,960 A1 (Miller); U.S. Pat. No. 5,774,525 (Kanevsky); and U.S. Pat. No. 5,668,876 (Falk). Woodhill may require the response to an authentication inquiry to be sent in full duplicate on two different communication links. However, the authentication query is still transmitted on a single communication link and the recipient maintains control over issuing duplicate responses.

BRIEF SUMMARY OF THE INVENTION

This invention provides an enhanced authenticity check of a proposed future or current participant in a multi-party dialog between mobile communication devices/participants. An authenticity challenge query is generated and split into plural portions, none of such portions individually containing sufficient information to fully define the challenge query. These separated portions are separately communicated to the proposed future or current participant whose authenticity is to be checked over at least two separate communication channels thus enhancing the probability that a challenge response is authentic.

In a preferred exemplary embodiment, the authenticity challenge query may include the formation of a logical combination between first and second data strings to produce a resultant third data string. For example, the first data string may comprise a generated mask string while the second string may comprise a question that can be easily answered by the challenged participant if the participant is authentic. For example, the logical combination of these first and second data strings may include performing an exclusive-OR between the two data strings.

The first data string and the third data string (i.e., the one which results from a logical combination of the first two data strings) may then be separately sent over respective different communication channels which are each believed to be uniquely directed to the authentic participant. Upon receipt of these different portions by the challenged participant, the authenticity challenge query may be reconstructed and then answered by sending an appropriate query response back to the first participant (i.e., the participant issuing the challenge). For example, an inverse logical combination of the two received strings may be performed. In the case of a relatively simple exemplary embodiment, a second exclusive-OR performed between the received first and third data strings would produce the missing second data string (i.e., a question that could be easily answered by the challenged participant if that participant is authentic).

When the participant issuing the challenge receives a response, it can then be checked to see whether the response is the correct expected response to the authentication query. If so, then the probability that the challenged participant is authentic has been enhanced because the query (and therefore the appropriate response) could only have been determined if the challenged participant correctly received the different portions of the challenge over at least two separate communication channels.

A peer-to-peer routing system with which this invention is particularly useful is described in commonly assigned application No. 60/503,367 filed Sep. 16, 2003 entitled "QUICK MESSAGING USING PEER-TO-PEER ROUTING" and naming as inventors Mihal Lazaridis, Gerhard D. Klassen, Christopher R. Wormald and Sherryl Lea Lorraine Scott where the service has been referred to as Quick Messaging (QM). Such earlier application recognizes and at least partially addresses a major security problem in such substantially real time multi-party dialog systems, namely, the problem of authenticating the identity of a proposed future and/or current participant in such a multi-party dialog.

The invention may be embodied in hardware, software or a combination of hardware and software. The invention also provides a method for enhanced authenticity checking of a proposed future or current participant in a multi-party dialog between mobile communication devices/participants.

BRIEF DESCRIPTION OF THE DRAWINGS

These and other objects and advantages of this invention will be more completely appreciated and understood by careful study of the following detailed description of at least one exemplary embodiment of this invention in conjunction with the following drawings, of which.

DETAILED DESCRIPTION OF THE INVENTION

Figure 1:
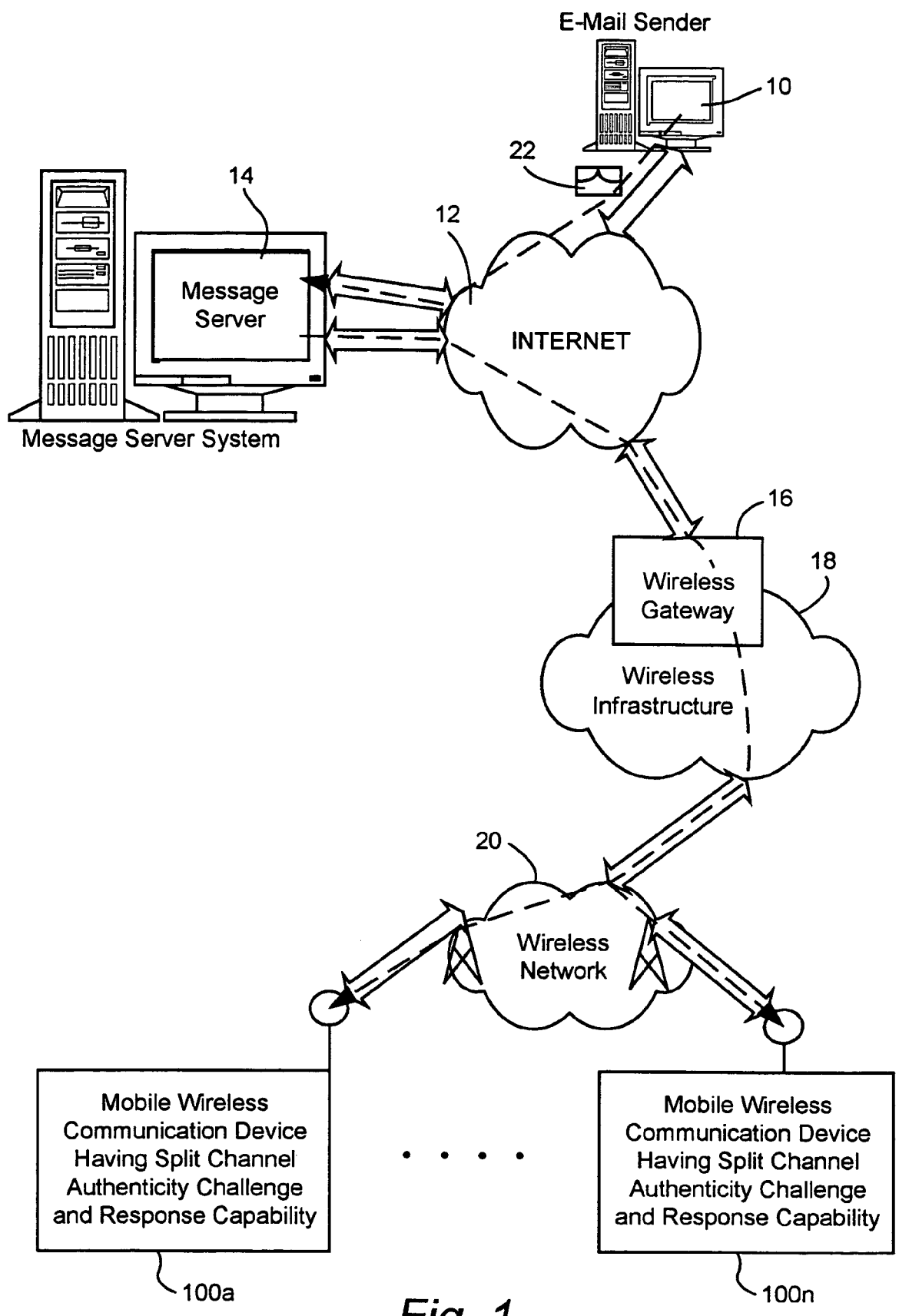
FIG. 1 is an overall system wide schematic view of an exemplary wireless e-mail communication system incorporating a mobile wireless communication device having split channel authenticity challenge capability in accordance with one exemplary embodiment of this invention.
Figure 2:
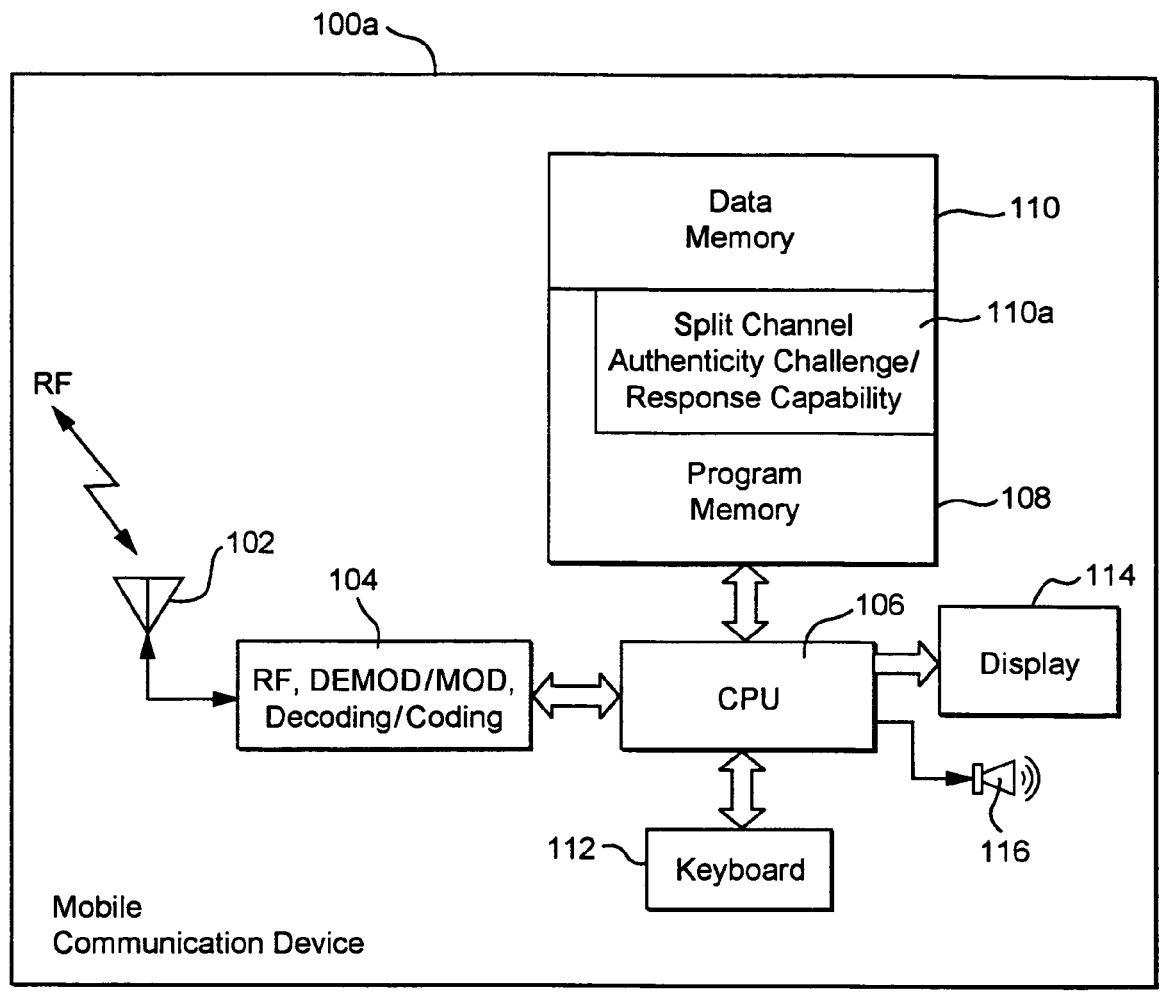
FIG. 2 is an abbreviated schematic diagram of hardware included within an exemplary mobile wireless communication device of FIG. 1.

FIG. 1 is an overview of an exemplary communication system in which wireless communication devices 100a-100n may be used in accordance with this invention. One skilled in the art will appreciate that there may be hundreds of different system topologies. There may also be many message senders and recipients. The simple exemplary system shown in FIG. 1 is for illustrative purposes only, and shows perhaps the currently most prevalent Internet e-mail environment.

FIG. 1 shows an e-mail sender 10, the Internet 12, a message server system 14, a wireless gateway 16, wireless infrastructure 18, a wireless network 20 and mobile communication devices 100a-100n.

An e-mail sender 10 may, for example, be connected to an ISP (Internet Service Provider) on which a user of the system has an account, located within a company, possibly connected to a local area network (LAN), and connected to the Internet 12, or connected to the Internet 12 through a large ASP (application service provider) such as America Online™ (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 14 may be implemented, for example, on a network computer within the firewall of a corporation, a computer within an ISP or ASP system or the like, and acts as the main interface for e-mail exchange over the Internet 12. Although other messaging systems might not require a message server system 14, a mobile device 100a-100n configured for receiving and possibly sending e-mail will normally be associated with an account on a message server. Perhaps the two most common message servers are Microsoft Exchange™ and Lotus Domino™ these products are often used in conjunction with Internet mail routers that route and deliver mail. These intermediate components are not shown in FIG. 1, as they do not directly play a role in the invention described below. Message servers such as server 14 typically extend beyond just e-mail sending and receiving; they also include dynamic database storage engines that have predefined database formats for data like calendars, to-do lists, task lists, e-mail and documentation.

The wireless gateway 16 and infrastructure 18 provide a link between the Internet 12 and wireless network 20. The wireless infrastructure 18 determines the most likely network for locating a given user and tracks the users as they roam between countries or networks. A message is then delivered to a mobile device 100a-100n via wireless transmission, typically at a radio frequency (RF), from a base station in the wireless network 20 to the appropriate mobile device 100a-100n. The particular network 20 may be virtually any wireless network over which messages may be exchanged with a mobile communication device.

As shown in FIG. 1, a composed e-mail message 22 is sent by the e-mail sender 10, located somewhere on the Internet 12. This message 22 typically uses traditional Simple Mail Transfer Protocol (SMTP), RFC 822 headers and Multipurpose Internet Mail Extension (MIME) body parts to define the format of the mail message. These techniques are all well known to those skilled in the art. The message 22 arrives at the message server 14 and is normally stored in a message store. Most known messaging systems support a so-called "pull" message access scheme, wherein a mobile device 100a-100n must request that stored messages be forwarded by the message server to the mobile device 100. Some systems provide for automatic routing of such messages which are addressed using a specific e-mail address associated with a mobile device 100a-100n. In a preferred embodiment, messages addressed to a message server account associated with a host system such as a home computer or office computer which belongs to the user of a mobile device 100a-100n are redirected from the message server 14 to a mobile device 100a-100n as they are received.

Regardless of the specific mechanism controlling forwarding of messages to mobile devices 100a-100n, the message 22, or possibly a translated or reformatted version thereof, is sent to wireless gateway 16. The wireless infrastructure 18 includes a series of connections to wireless network 20. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Group Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

A system of the type depicted in FIG. 1 may also permit direct peer-to-peer communication between mobile communication devices 100a . . . 100n (e.g., using unique device PIN data for direct addressing). Such direct communication (e.g., sometimes referred to as "over the PIN") thus bypass IT administrator controls and permit substantially real time peer-to-peer dialogs to occur (e.g., Quick Messaging or "QM").

A mobile communication device 100a-100n will also typically include a main control CPU 106 which operates under control of a stored program in program memory 108 (and which has access to data memory 110). CPU 106 also communicates with a conventional keyboard 112, display 114 (e.g., an LCD) and audio transducer or speaker 116. A portion of program memory 110a is available for storing program logic providing split channel authenticity checking of IM (Instant Messaging) or QM (Quick Messaging) or other substantially real time dialog participants as described below.

The above referenced commonly assigned copending application recognizes that, when requested, a person sending a QM invitation can transmit the invitation over multiple communication paths. Each communication path effectively confirms a different address identity for the sender, thus helping to confirm authenticity of the sender's request. For example, if a QM request is sent, it could be sent over both e-mail and SMS (Short Message Service Protocol which is used throughout North America and especially in Europe). In this earlier proposal, when sending requests over two data paths, once the receiver receives both requests, either request could be opened to confirm the invitation and authenticity of the sender. It will be understood that there are many possible separate communication channels that may be used. For example, currently there are available e-mail SMS, MMS, EMS, IMS and the like. Any of these and other existing and/or future communications channels may be used if available and desired.

The earlier commonly assigned copending application also contemplated a QM requester making a voice call so that a voice authenticity check could be performed by the recipient of the invitation (which could then be sent and/or accepted in machine readable form over the calling telephone connection using an exchange of DTMF tones or the like between the two proposed participants).

Since some "real time" dialogs may continue to exist for very long periods of time (e.g., days, weeks, months, perhaps even years), it also important for participants to be able to challenge each other at any appropriate time to insure that the other participant(s) is (are) truly authentic. In addition, sending the same invitation over multiple channels, while perhaps a useful authenticity-checking routine for initiating a dialog from the requesting party's view point, it may not be sufficient to insure authenticity to the recipient of such request (i.e., invitation). That is, the recipient of the invitation may want to issue an independent authenticity challenge back to the party requesting a dialog.

In another context, when one registers for a service, such as going to a particular webpage and registering to receive desired news or other information, often an e-mail is sent to the requester containing a password to allow access the service. Unfortunately, this e-mail becomes a single point of attack for anyone interested in using this service and later pretending to be the original party. Here we provide a method to mitigate the risk by splitting up the "login" information into different channels. This is especially useful in the Quick Messaging case. In addition, this method allows one to decide if two pieces of information, such as a PIN and e-mail address, should be associated with each other.

In particular, in the exemplary embodiment, authentication information is split into two parts. These two parts are sent to the user over different channels, such as HTTP and E-mail or SMS (Short Message Service), MMS (Multi-Media Messaging), PIN, etc. Hence, this may be analogous in some respects to tearing an authenticating ticket in half.

Once the user has all of the information parts, he/she can reconstruct the authentication query to validate himself/herself to the service.

For example, once the user signs up for a service, he/she could be sent half of the information via HTTP (since he/she is already currently connected) while the other half could be sent via e-mail. The reconstruction could also be done automatically so it would be seamless to the user.

Another place where this could be used is in Quick Messaging. When someone asks to QM you, the request may be sent directly peer-to-peer using a known PIN. To better make sure that the person is authentic (i.e., that the person making the request is really who he/she says), the receiving application could create an authentication challenge and send half back directly via a known (and to some extent trusted) PIN and the other half to the claimed source person's known (and to some extent trusted) e-mail address. If the user responds correctly, this would imply that he/she has had access to both the PIN and the e-mail address believed to be authentically associated with that person. This gives a stronger level of authentication than only one channel (e.g., the PIN) alone.

One benefit of this method is that it allows one to decide whether to form an association between two things—in this case, for example, an e-mail address and a PIN. Since the authentication is split over the e-mail and PIN, then if the user can put it back together properly, he/she must have access to both the e-mail and PIN.

Of course this does not get rid of risk entirely. All it does is raise the bar. If someone wants to get a person's authentication information, then they have to monitor multiple channels (such as e-mail and HTTP). This is much harder than watching just one channel.

It should also be noted this generalizes immediately to splitting the authentication information into n parts, i.e., using n different respectively corresponding channels to send the n authentication information parts.

Figure 3:
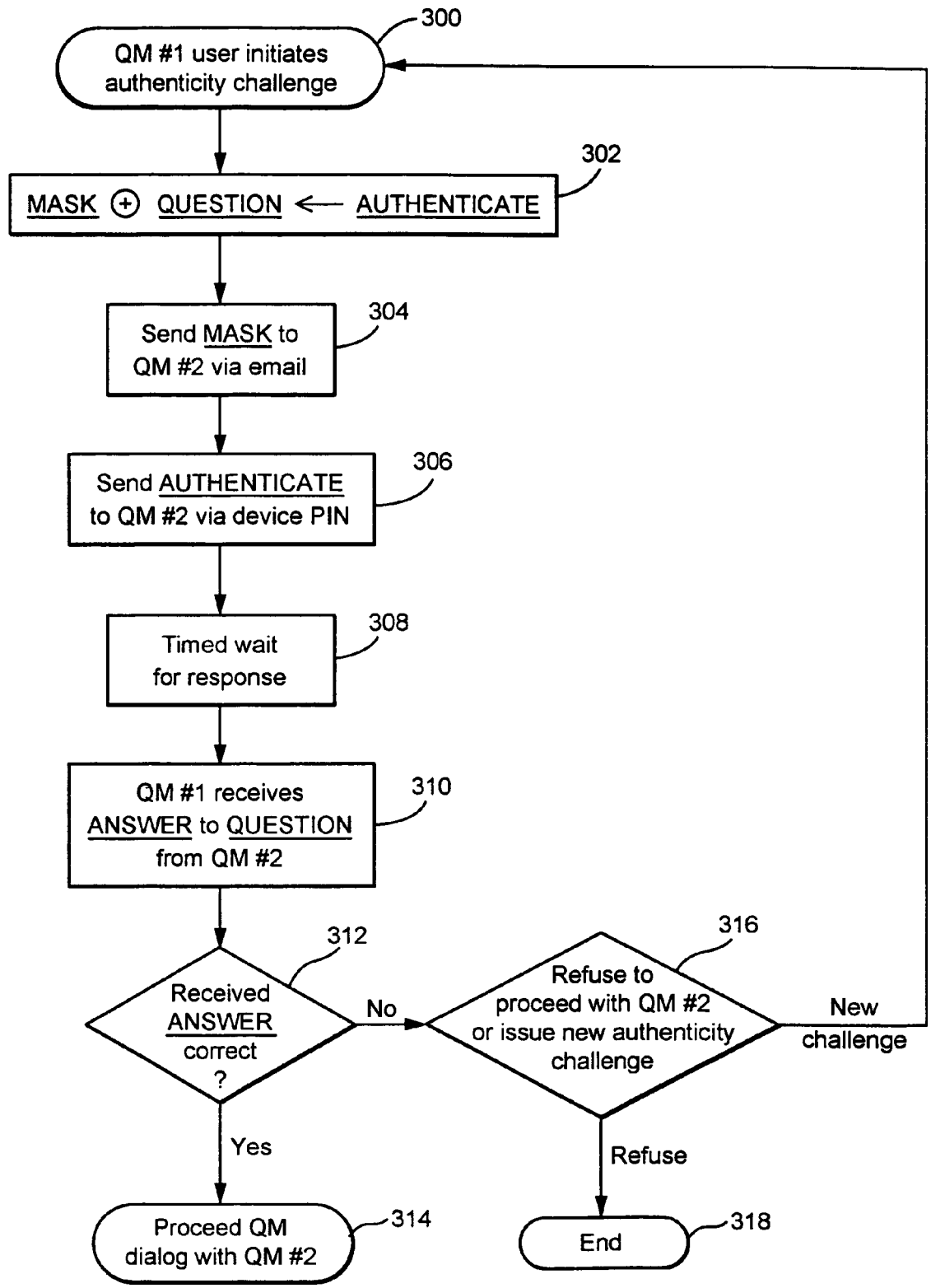
FIG. 3 is an abbreviated schematic flowchart of computer software (i.e., program logic) that may be utilized in the device of FIG. 2 for a first user to initiate an authenticity challenge to a second user (and to evaluate a response thereto when received)

If a QM user wishes to initiate an authenticity challenge, then a suitable program logic as shown in FIG. 3 may be entered at 300. Here, a QUESTION that should be easy for a challenged authentic participant to answer is exclusively ORed with another data string bearing the label MASK as depicted at 302. The result is stored and labeled as a third data string labeled AUTHENTICATE.

A first of these three data strings (e.g., MASK) may be then sent to a challenged possible future or current participant in a dialog via one communication channel that is believed to be associated uniquely with the authentic party (e.g., e-mail). At 306, another of the three data strings (e.g., the resultant AUTHENTICATE data string) is sent to the challenged user via a second separately authentic communication channel (e.g., via a device PIN connection). After a possible wait for a response at 308, the responsive answer is received at 310 by the participant issuing the challenge. This is tested for correctness at 312. If it tests correctly, then the dialog may be continued or initiated with the newly authenticated participant at 314. However, if the received answer is not correct (or is not received back within a desired maximum wait period), then a decision may be made at 316 whether to permit a new challenge to be issued so as to re-test that same (or perhaps another different) participant in an ongoing dialog (or a new dialog that is proposed). If an additional authenticity challenge is permitted, then the logic returns back to initiate a new authenticity challenge at 300. Otherwise, the challenged participant is refused further (or initial) participation and the process is ended at 318.

Figure 4:
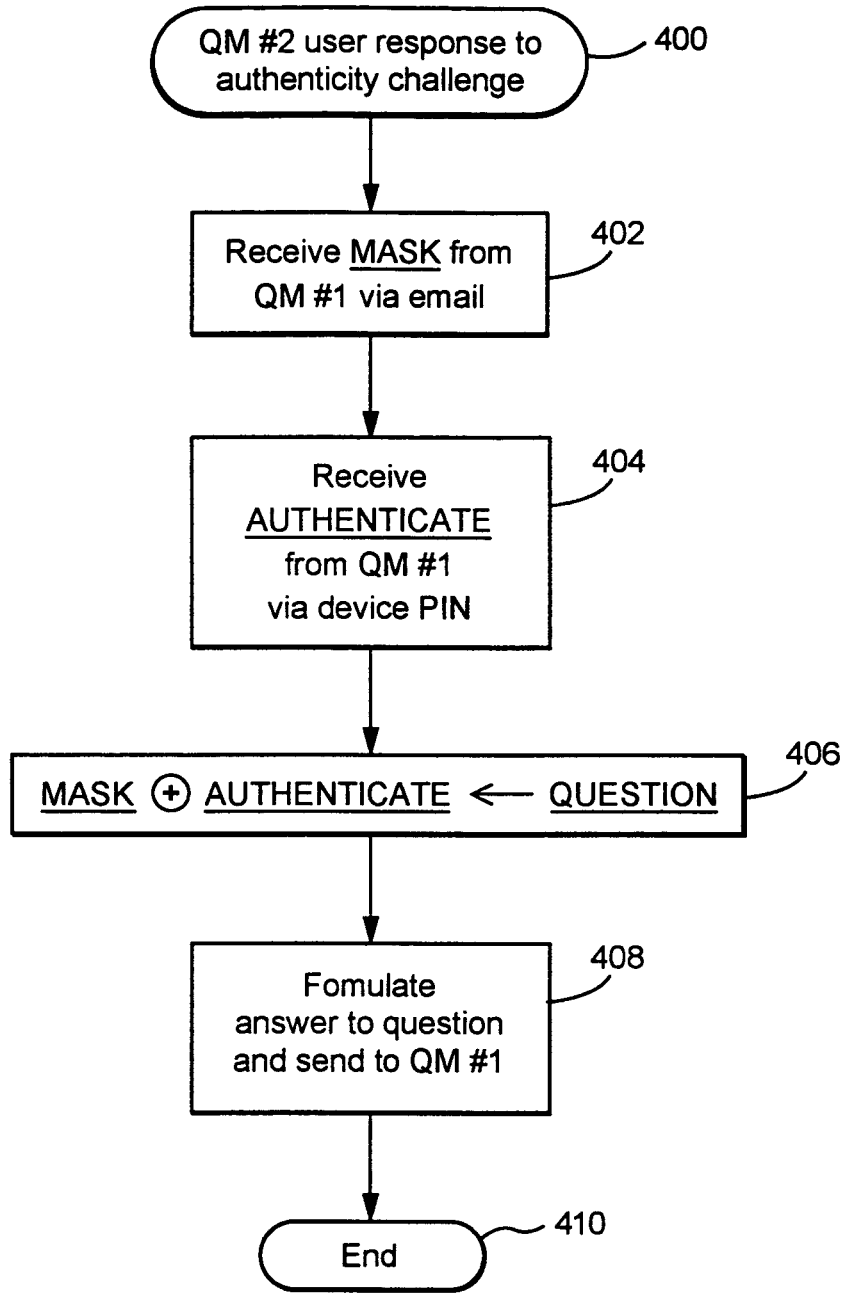
FIG. 4 is an exemplary abbreviated schematic flowchart of computer software (i.e., program logic) that may be utilized in the device of FIG. 2 to permit a user to respond to an authenticity challenge of the kind generated from the challenging participant in accordance with FIG. 3.

FIG. 4 depicts exemplary program logic for a challenged participant to respond to an authenticity challenge and is entered at 400. As depicted at 402 and 404, the separated parts of the authenticity challenge (e.g., the data string MASK and the data string AUTHENTICATE) are received via respectively different authentic communication channels (e.g., via e-mail and via a device PIN channel). At 406, a logical combination of the received strings (e.g., another exclusive-OR of the received MASK and AUTHENTICATE strings will provide the QUESTION string). This permits the challenged participant to formulate an answer to the QUESTION and to send it back to the challenging participant at 408 before the routine is exited at 410.

Other suitable techniques are also available for splitting the authentication query into plural parts, no one of which is sufficient by itself to fully define the query. For example, orthogonal hashes may be made to create plural parts which are all required to reconstruct the query. Careful construction of the query might even make it sufficient to divide the query into n strings, each string comprising successively displaced nth digits (e.g., Part $1=D_1D_{n+1}D_{2n+1}D_{3n+1}$ . . . Part $2=D_2D_{n+2}D_{2n+2}D_{3n+2}$ . . . Part $3=D_3D_{n+3}D_{2n+3}D_{3n+3}$ . . . etc.). Other possibilities will be apparent to those in the art.

While the invention has been described in connection with what is presently considered to be the most practical and preferred exemplary embodiments, it is to be understood that the invention is not limited to the disclosed embodiments but, on the contrary, covers all variations, modifications and equivalent arrangements included within the spirit and scope of the appended claims.

What is claimed is:

1. A method for, at a first communication device in use by a first party in a multi-party dialog, initiating checking of the authenticity of a second party in said multi-party dialog, said method comprising:
   receiving, at the first communication device, a request for the second party to participate in the multi-party dialog;
   in response to receiving the request, generating, using a central processing unit in said first communication device, an authenticity challenge query data string, wherein the authenticity challenge query data string comprises a question that is easily answerable by the second party in the multi-party dialog if the second party is authentic;
   forming, at said central processing unit and using said authenticity challenge query data string and a first data string, at least a second data string;
   sending, at said central processing unit, said first data string to a first address associated with said second party;
   sending, at said central processing unit, said second data string to a second address associated with said second party;
   receiving, at said first communication device, an answer to the question from a second communication device associated with said second party;
   determining that said answer is correct; and
   responsive to said determining, allowing participation of said second party in said multi-party dialog to proceed.

2. A method as in claim 1 wherein said sending said first data string and said sending said second data string comprises communicating over wireless communication channels.

3. A method as in claim 1 wherein:
   said forming said second data string comprises producing a logical combination of said first data string and said authenticity challenge query data string.

4. A method as in claim 3 wherein said producing said logical combination comprises performing an exclusive-OR operation with said first data string and said authenticity challenge query data string as input.

5. A method as in claim 1 wherein said method further comprises:
   receiving, at said second communication device, said first data string;
   receiving, at said second communication device, said second data string;
   reconstructing, at said second communication device, said authenticity challenge query data string from said first data string and said second data string;
   formulating, at said second communication device, the answer to the question of said authenticity challenge query data string; and
   sending, at said second communication device, said answer to said first party.

6. A method as in claim 5 wherein:
   said forming said second data string comprises producing a logical combination of said first data string and said authenticity challenge query data string.

7. A method as in claim 6 wherein:
   said reconstructing said authenticity challenge query data string comprises producing a logical combination of said first data string and said second data string.

8. A method as in claim 7 wherein:
   said producing the logical combination during said forming said second data string comprises performing an exclusive-OR operation with said first data string and said authenticity challenge query data string as input.

9. A method as in claim 8 wherein:
   said producing the logical combination during said reconstructing said authenticity challenge query data string comprises performing an exclusive-OR operation with said first data string and said second data string as input.

10. A system for initiating checking of the authenticity of a second party in a multi-party dialog, said system comprising:
    a first communication device with a main control central processing unit adapted to:
      receive a request for the second party to participate in the multi-party dialog;
      in response to receipt of the request, generate an authenticity challenge query data string, wherein the authenticity challenge query data string comprises a question that is easily answerable by the second party in the multi-party dialog if the second party is authentic;
      form, using said authenticity challenge query data string and a first data string, at least a second data string;
      send said first data string to a first address associated with said second party;
      send said second data string to a second address associated with said second party;
      receive, at said first communication device, an answer to the question from a second communication device associated with said second party;
      determine that said answer is correct; and
      allow participation of said second party in said multi-party dialog to proceed.

11. A system as in claim 10 further comprising a second communication device associated with said second party, wherein said multi-party dialog is conducted over wireless communication channels, where at least one of said first communication device and second communication device is a mobile wireless communication device.

12. A system as in claim 10 wherein:
    said main control central processing unit is further adapted to form said second data string by producing a logical combination of said first data string and said authenticity challenge query data string.

13. A system as in claim 12 wherein said main control central processing unit is further adapted to form said second data string by performing an exclusive-OR operation with said first data string and said authenticity challenge query data string as input.

14. A system as in claim 10, wherein a main control central processing unit at said second communication device is adapted to:
    receive said first data string;
    receive said second data string;
    reconstruct said authenticity challenge query data string from said first data string and said second data string;
    formulate the answer to the question of said authenticity challenge query data string; and
    send said answer to said first party.

15. A system as in claim 14 wherein:
    main control central processing unit at said first communication device is further adapted to form said second data string by producing a logical combination of said first data string and said authenticity challenge query data string.

16. A system as in claim 15 wherein:
said main control central processing unit at said second communication device is further adapted to reconstruct said authenticity challenge query data string by producing a logical combination of said first data string and said second data string.

17. A system as in claim 16 wherein:
said main control central processing unit at said first communication device is further adapted to form said second data string by performing an exclusive-OR operation with said first data string and said authenticity challenge query data stream as input.

18. A system as in claim 17 wherein:
said main control central processing unit at said second communication device is further adapted to reconstruct said authenticity challenge query data string by performing an exclusive-OR operation with said first data string and said second data string as input.

19. A computer program storage medium holding a computer program, which, when executed by a processor to initiate a check of the authenticity of a second party in a multi-party dialog, causes said processor to:
receive a request for the second party to participate in the multi-party dialog;
in response to receipt of the request, generate an authenticity challenge query data string, wherein the authenticity challenge query data string comprises a question that is answerable by the second party in the multi-party dialog if the second party is authentic;
form, using said authenticity challenge query data string and a first data string, at least a second data string;
send said first data string to the first address associated with said second party;
send said second data string to a second address associated with said second party;
receive an answer to the question from a second communication device associated with said second party;
determine that said answer is correct; and
allow participation of said second party in said multi-party dialog to proceed.

20. A computer program storage medium as in claim 19 wherein said multi-party dialog is conducted over wireless communication channels using at least one mobile wireless communication device.

21. A computer program storage medium as in claim 19 wherein:
computer program further causes said processor to form said second data string by producing a logical combination of said first data string and said authenticity challenge query data string.

22. A computer program storage medium as in claim 21 wherein said logical combination comprises an exclusive-OR of said first data string and said authenticity challenge query data string.

23. A system for use for a dialog between a first party and at least a second party, said system comprising:
a first communication device for use by said first party, said first communication device adapted to:
receive a request for the second party to participate in the multi-party dialog;
in response to receipt of the request, generate an authenticity challenge query data string, wherein the authenticity challenge query data string comprises a question that is answerable by the second party in the multi-party dialog if the second party is authentic;
form, using said authenticity challenge query data string and a first data string, at least a second data string;
send said first data string to a first address associated with said second party;
send said second data string to a second address associated with said second party;
receive an answer to the question of said authenticity challenge query data string from a second communication device associated with the second party;
determine that said answer is correct; and
responsive to said determining, allow participation of said second party in said dialog to proceed;
the second communication adapted to:
receive said first data string;
receive said second data string;
reconstruct said authenticity challenge query data string from said first data string and said second data string;
formulate said answer to the question of said authenticity challenge query data string; and
send said answer to an address associated with said first party.

24. The method of claim 1 wherein said first address is one of an e-mail address, a Short Messaging Service address, a Multimedia Messaging Service address, a Hypertext Transport Protocol Address and an Instant Messaging System address.

25. The method of claim 24 wherein said second address is one of an e-mail address, a Short Messaging Service address, a Multimedia Messaging Service address, a Hypertext Transport Protocol Address and an Instant Messaging System address, said second address being distinct from said first address.

* * * * *